Nov. 22, 1927.

J. B. GREER 1,650,345

GLASS CUTTING APPARATUS

Filed Aug. 6, 1925  7 Sheets-Sheet 1

INVENTOR
James Boyd Greer
By Kay, Totten & Martin,
Attorneys.

Nov. 22, 1927.

J. B. GREER 1,650,345

GLASS CUTTING APPARATUS

Filed Aug. 6, 1925  7 Sheets-Sheet 2

INVENTOR
James Boyd Greer
By Ray, Totten & Martin,
Attorneys

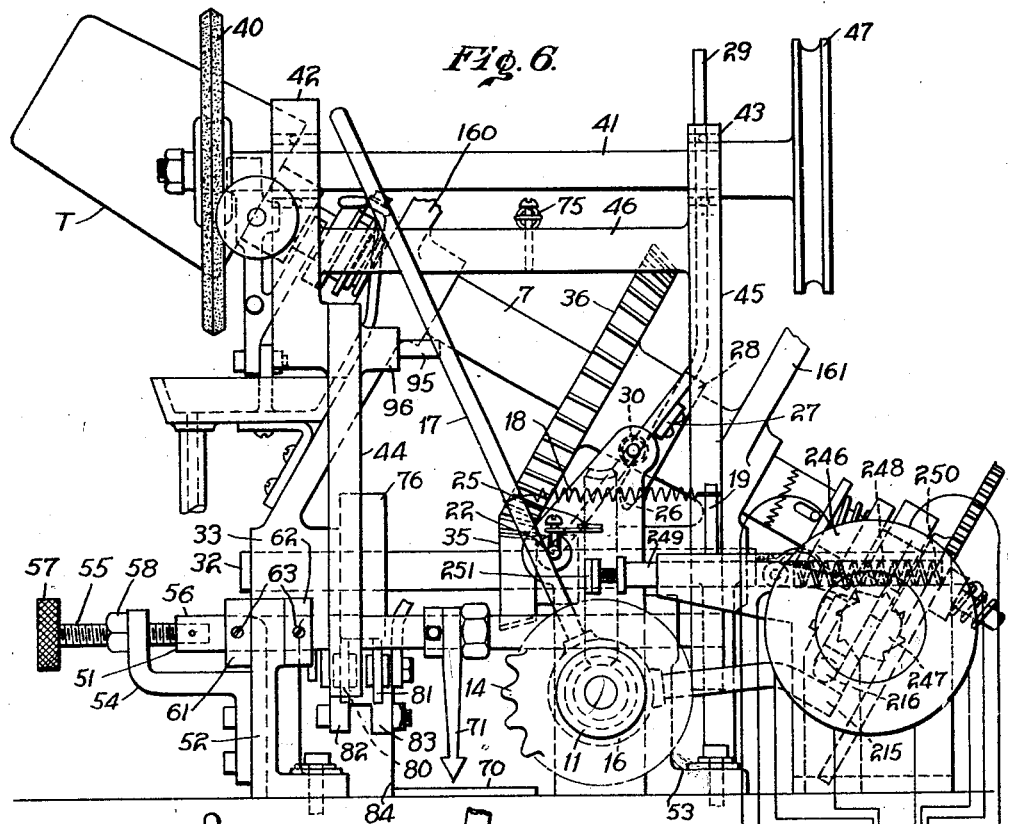
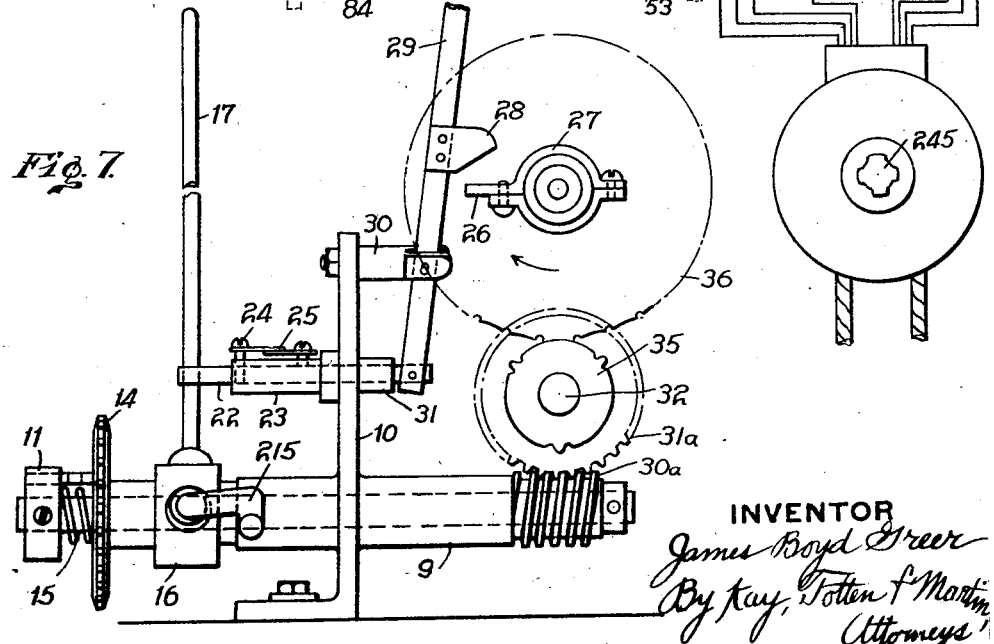

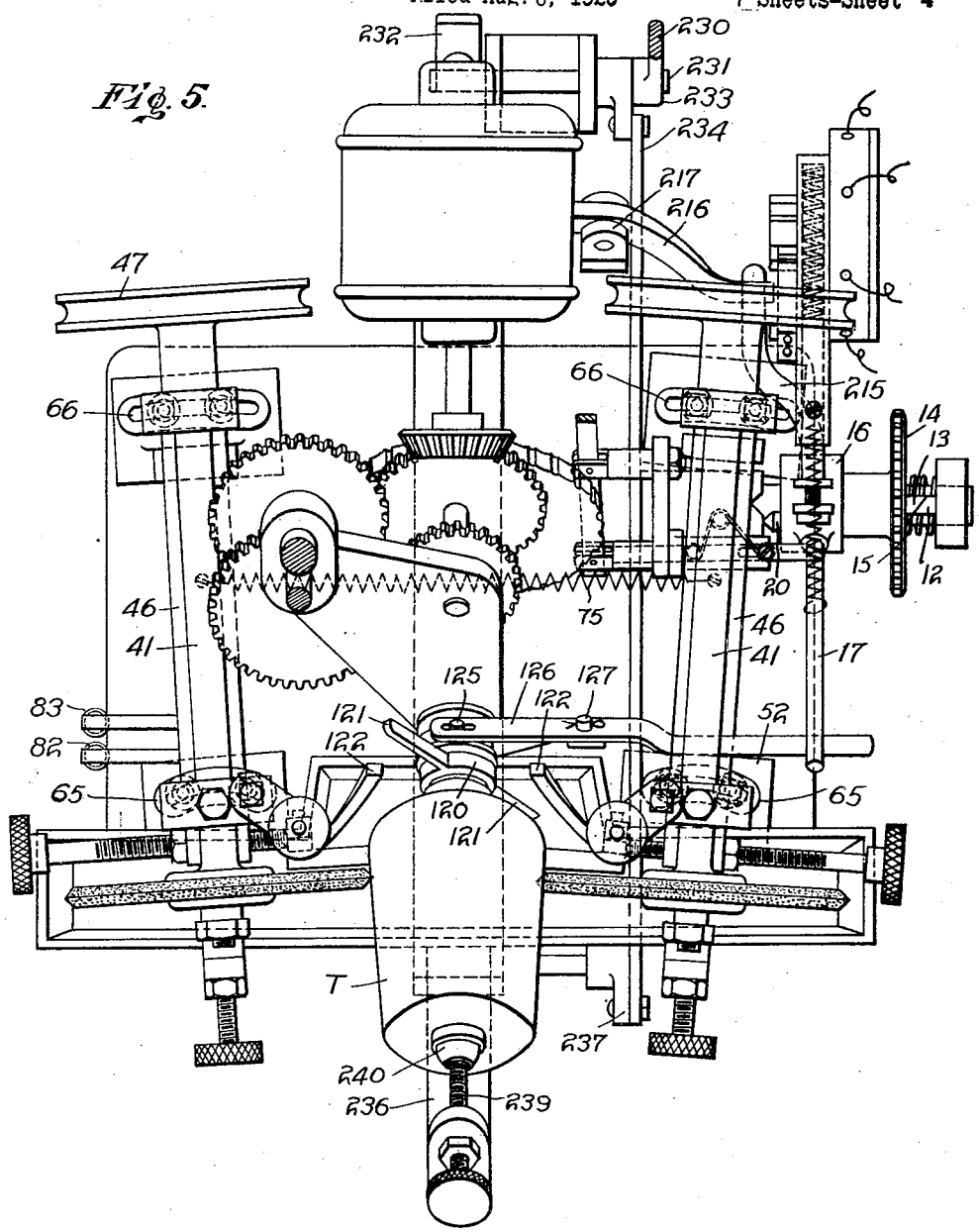

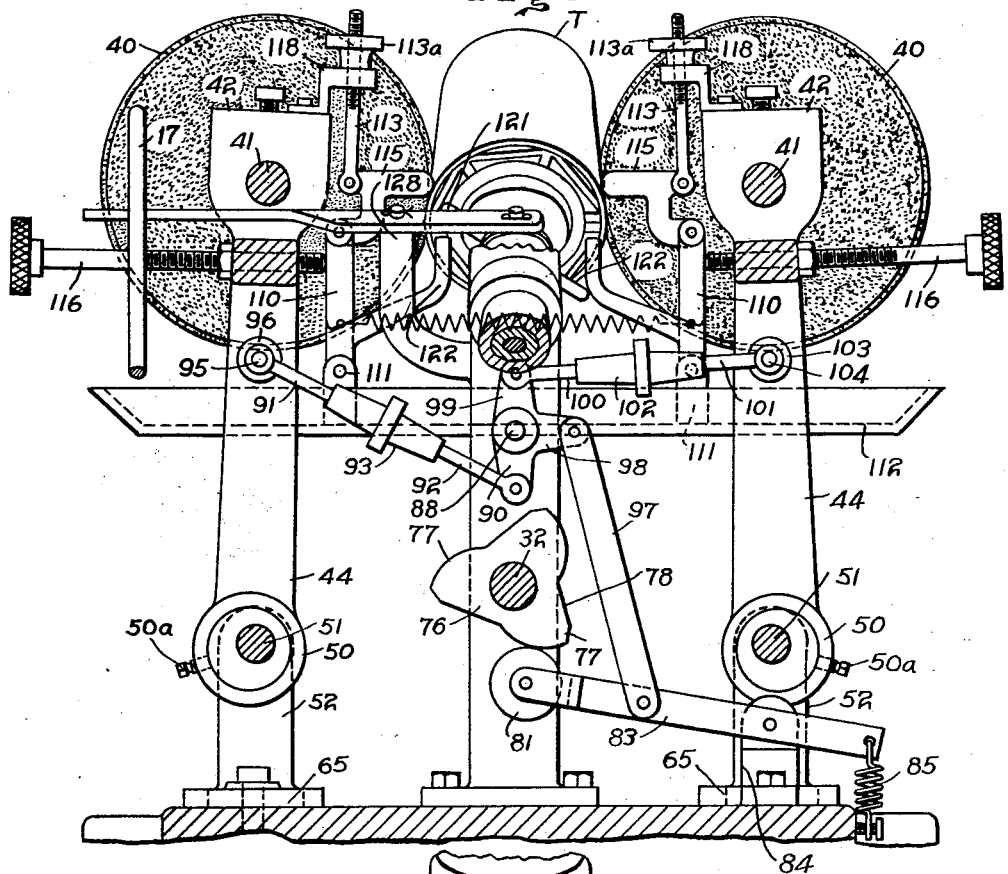

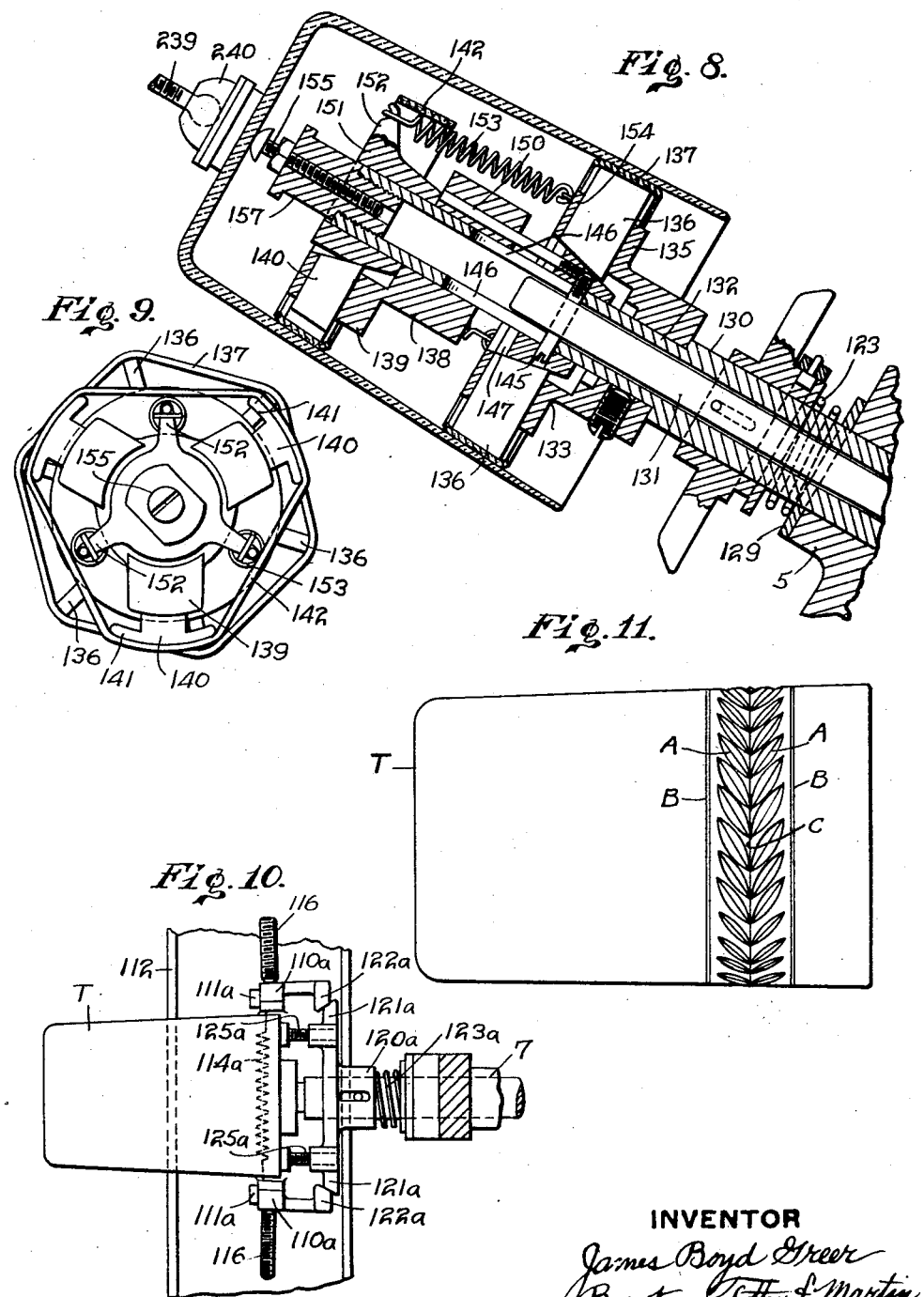

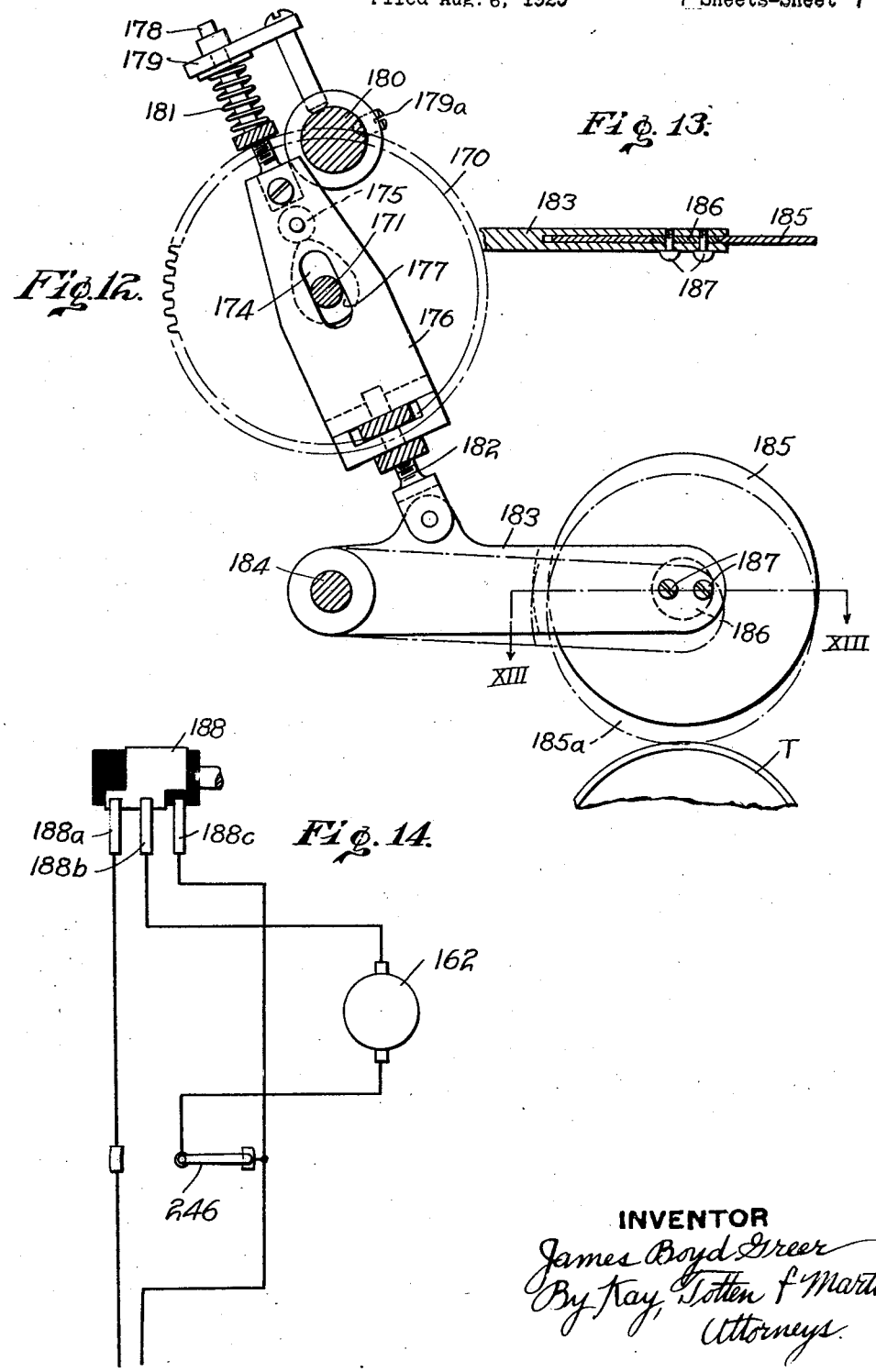

Patented Nov. 22, 1927.

1,650,345

UNITED STATES PATENT OFFICE.

JAMES BOYD GREER, OF PITTSBURGH, PENNSYLVANIA, ASSIGNOR TO THE GREER MANUFACTURING COMPANY, OF CLEVELAND, OHIO, A CORPORATION OF OHIO.

GLASS-CUTTING APPARATUS.

Application filed August 6, 1925. Serial No. 48,450.

My invention relates to machines for cutting designs upon tumblers, goblets, vases, and hollow glassware in general. It has special reference to the type of glass-cutting machine wherein the glass article to be decorated is held upon an intermittently rotated chuck, and the design is applied to the glass by means of one or more continuously rotated wheels which reciprocate toward and away from the chuck so as to engage the glass in the intervals between the partial rotations of the chuck.

One object of my invention is to provide a glass cutting machine having a wide range of adjustments, whereby the machine may be readily adapted to cut various designs upon glassware of different sizes and shapes.

Another object of my invention is to provide improved means for rotating the chuck, whereby the partial rotations of the chuck shall be made exactly uniform, and whereby it will be held against accidental rotative movement during cutting of an article.

Another object of my invention is to provide improved means for holding the glass article upon a chuck.

Still another object is to provide an improved form of banding device.

A still further object of my invention is to provide a glass cutting machine which shall include design-cutting mechanism and banding mechanism in a single self-contained unit, and to provide means for operating the design-cutting and band-cutting mechanisms in suitable succession, the banding mechanism being automatically operable upon completion of the design-cutting mechanism.

A still further object of my invention is to provide an improved compensating device for causing the cutting wheels of a glass-cutting machine to form cuts of uniform depth in the glassware, irrespective of whether the ware is of regular or irregular contour, and which are readily adjustable to glassware of various diameters.

A still further object of my invention is to provide a glass-cutting machine having indicating means whereby the machine may be quickly and accurately set up for various designs without requiring great skill on the part of the operator, and also without preliminary trials which consume time and which waste glassware.

Figure 1:
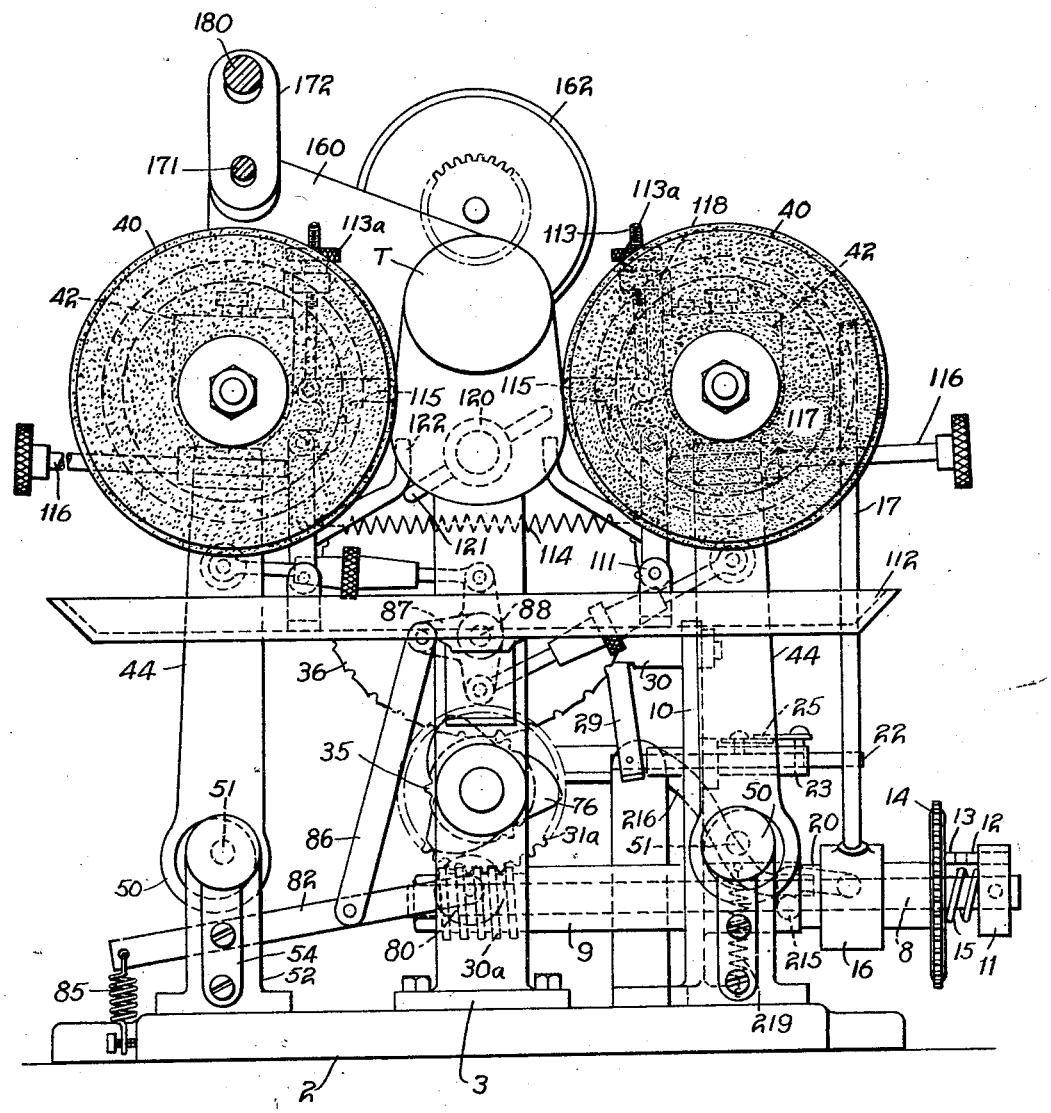
Figure 2:
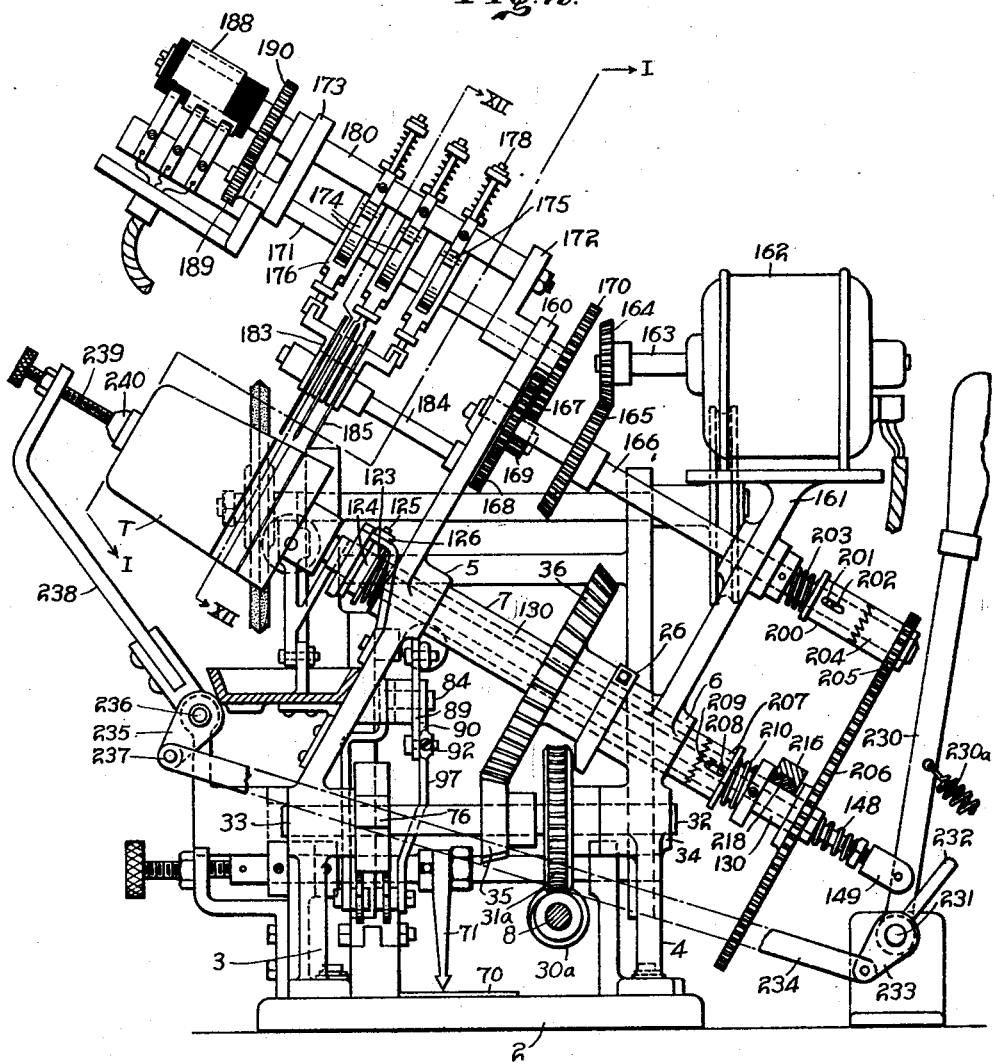
Figure 2A:
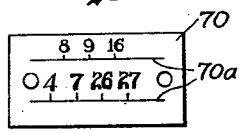

Other objects and advantages of my machine will appear from the following description, taken in connection with the accompanying drawings in which:

Fig. 1 is a view, in front elevation, of a cutting and banding machine embodying my invention, taken on the line 1—1 of Fig. 2; Fig. 2 is a view of the machine, in side elevation; Fig. 2$^A$ is a plan view of the indicator plate; Fig. 3 is a rear elevational view, with certain of the parts removed; Fig. 4 is a plan view of a portion of the machine, showing the relation of the cutting wheels to the article being cut; Fig. 5 is a plan view of the machine, with the banding mechanism removed; Fig. 6 is a side elevational view, looking from the left of Fig. 1; Fig. 7 is a fragmentary rear elevational view showing the main drive and throw-out mechanism; Fig. 8 is a longitudinal sectional view, on an enlarged scale, of the chuck, showing a tumbler in position thereon; Fig. 9 is an end view of the chuck; Fig. 10 is a modification of the means for operating the compensating or feeling device shown in Figs. 1, 3 and 4; Fig. 11 shows a tumbler to which a design has been applied by the machine; Fig. 12 is a view, on an enlarged scale, of certain of the banding mechanism of Fig. 2; Fig. 13 is a sectional view of one of the banding wheels and its supporting arm, and Fig. 14 is a view showing schematically the manner in which the circuit of the motor which rotates the chuck during the banding operation is controlled.

The general features of the machine herein shown include a chuck carried upon an inclined chuck shaft and rotated intermittently by means of a novel arrangement of intermittent gears; pivoted frames carrying the cutting wheels and rocked simultaneously upon their pivots so as to move the cutting wheels toward and away from the chuck; a compensating device associated with the chuck and the grinding wheels; a throwout device for stopping the action of the grinding wheels after the design has been completed; and a banding device, so arranged as to rotate the chuck continuously after the first design has been completed, and to apply to the surface of the glass one or more banding wheels which operate to cut circular bands upon the ware in accurate registry with the design applied to the glass by means of the cutting wheels.

In the drawing the numeral 2 indicates a base upon which are rigidly mounted a front standard 3 and a rear standard 4. A front chuck shaft bearing 5 is carried by the standard 3, and a rear chuck shaft bearing 6 is carried by the rear standard 4. A hollow shaft 7 is rotatably supported in the bearings 5 and 6 and transmits rotary movement to a chuck adapted to carry the glassware to be decorated. The construction and operation of this chuck will be described below.

The main drive.

Power for rotating the hollow shaft 7 is derived from a horizontal shaft 8 which is mounted in a long bearing sleeve 9 carried by a standard 10. The power shaft 8 carries at its outer end a clutch member 11 which has a clutch tooth 12 adapted to engage a corresponding clutch tooth 13 which is carried by a sprocket wheel 14 that is mounted loosely on the shaft 8 and is connected to any suitable source of power by means of a sprocket chain, not shown. A spring 15 surrounds the shaft 8 between the clutch member 11 and the sprocket wheel 14 and tends to force the sprocket wheel to the left, Fig. 1, so as to disengage the clutch teeth 12 and 13.

A shifting collar 16 is loosely mounted on the shaft 8 adjacent to the hub of the sprocket wheel 14 and carries a lever 17 to which is attached one end of a spring 18, Fig. 6, the other end of which is secured to some convenient stationary part of the machine such as a bracket 19 which is carried by the base 2. The collar 16 has a lateral wedge-shaped tooth 20, Fig. 5, which is adapted to engage a notch in the end of the shaft bearing 9. This notch acts as a cam when the collar 16 is turned by means of the lever 17, forcing the tooth 20 out of the notch and thus moving the sprocket wheel 14 to the right, Fig. 1, and to the left, Fig. 7, against the compression of the spring 15, and thereby causing the clutch tooth 13 to engage the clutch tooth 12, thus driving the shaft 8.

A detent 22 is mounted slidably in a bearing 23 carried by the standard 10, as best shown in Fig. 7, and this detent is connected by means of a pin 24 to a spring 25 which tends to move the detent outwardly so that its tapered forward end is in the path of movement of the clutch-shifting lever 17. The detent 22 thus holds the lever 17 in the driving position as shown in Fig. 6, until the detent 22 is withdrawn from the path of the lever 17, whereupon the spring 18 moves the clutch lever 17 to the position in which the tooth 20 enters the notch in the bearing 9, whereupon the spring 15 separates the clutch teeth 13 and 12 and the power shaft 8 is stopped.

This throw-out movement of the detent 22 is produced by means of a lug 26 (Figs. 6 and 7) carried by a split collar 27 that is secured adjustably to the hollow chuck shaft 7 just above the rear chuck shaft bearing 6. The rotation of the chuck shaft brings the lug 26 into engagement with a lug 28 carried by a throw-out lever 29 which is pivotally mounted on a bracket 30 carried by the standard 10, and the lower end of which is connected at 31 to the inner end of the detent member 22. It will be seen by referring to Fig. 7 that when the chuck shaft 7 rotates in a clock-wise direction, as seen in this figure, to raise the lug 26, this lug will engage the lug 28 and will act through the lever 29 to withdraw the detent 22 from engagement with the clutch lever 17. It will also be seen that after the lug 26 passes beyond the lug 28, the detent 22 will be forced out again by the spring 25 in proper position to engage and lock the clutch lever 17 when the machine is again started.

The power shaft 8 carries a worm $30^a$ which meshes with a worm gear $31^a$ on a horizontal shaft 32 which is mounted in bearings 33 and 34 in the front and rear standards 3 and 4. The shaft 32 carries a small intermittent bevel pinion 35 which is here shown as having three teeth that mesh with notches in a larger intermittent bevel gear 36 which is secured to the hollow chuck shaft 7. The large intermittent gear 36 is provided with a number of dwells corresponding to the number of cuts that are to be made in the glass article during one complete rotation of the chuck shaft. A commercial line of cut glassware requires a number of different designs having different numbers of cuts, and I therefore preferably provide a set of interchangeable gears 36, any of which is adapted to be mounted on the chuck shaft 7 and to mesh properly with the intermittent pinion 35. The proportions of the gears 35 and 36 are so selected that the chuck shaft 7 is given successive partial rotation with suitable intervals of rest between them, such intervals being sufficient to permit the cutting wheels to move into and out of engagement with the glass before the next partial rotation takes place.

I consider that this method of intermittently rotating the chuck shaft is an important improvement in machines of this character, since it does away with many complicated and troublesome parts, such as ratchets, pawls and springs, which have heretofore been used in imparting intermittent movement to the chuck shafts in machines of this general type.

The cutting wheel mechanism.

Mounted on opposite sides of the chuck are two cutting wheels 40 of suitable abrasive material. Each of the cutting wheels 40 may be carried upon the forward end of a horizontal shaft 41 which is mounted in bearings 42 and 43 that project above a swinging frame composed of upright members 44 and 45 connected by a horizontal member 46. Pulleys 47 are secured to the rear ends of the shafts 41 and may be driven continuously by means of suitable driving belts. These belts and their driving means are not shown herein, since my present invention is not concerned with this part of the apparatus.

The lower ends of the uprights 44 and 45 (Figs. 3 and 6) composing each of the swinging cutter frames are pivotally mounted so that the cutter frames may be swung to carry the cutting wheels 40 toward and away from the chuck. As shown, the lower ends of the uprights 44 and 45 are mounted upon eccentrics 50 that are carried adjustably by stationary horizontal shafts 51. Each of the eccentrics 50 is individually adjustable upon its supporting shaft 51 and is secured in its adjusted position by means of a set screw 50ᵃ.

The arrangement of the eccentrics 50 and the shafts 51 should be particularly noted, since it provides in a simple manner for adjusting the cutting wheels forward and back, and also laterally, vertically and angularly. Each of the horizontal shafts 51 which carries the eccentrics 50 is mounted in bearings in a short standard 52 at the front of the machine and in a short standard 53 at the rear of the machine. The front standard 52 carries a forwardly projecting bracket 54 (Fig. 6), the outer and upper portion of which is provided with a screw-threaded opening through which extends a screw 55, the inner end of which is received in a loose fitted opening in the forward end 56 of the shaft 51 by a pin. A knurled knob or other turning means 57 is carried by the outer end of the screw 55 and it will be evident that by turning the screw 55 the shaft 51 will be moved lengthwise and that this movement is accompanied by similar forward or rearward movement of the cutter frame and cutting wheel carried by this shaft. The lengthwise position of the shaft is fixed by means of a lock nut 58 carried by the screw 55 and bearing against the outer surface of the bracket 54.

The angular position of both of the eccentrics 50 carried by each of the shafts 51 may be adjusted by turning the shaft 51, suitably by means of a wrench applied to a nut 60 which is carried by the shaft 51. When the eccentrics 50 are thus rotated, they vary the position of the axis around which the cutter frame rocks, and this axis may be shifted both laterally and vertically according to the turning movement imparted to the eccentrics 50. A certain amount of angular adjustment is also possible through the individual adjustment of these eccentrics. The shafts 51 are secured in their adjusted positions, so that the eccentrics 50 will not turn during the operation of the machine, by means of collars 61 and 62 which surround each shaft 51, and bear against the front and rear surfaces of the front shaft bearings as shown in Fig. 6. These collars are secured to the shaft 51 by means of set screws 63 which also assist the lock nuts 58 in preventing lengthwise movement of the shafts 51. The use of these collars prevents accidental loosening of any of the adjustments when the machine is running.

The cutter shafts 41 are preferably adjusted before the machine is put in operation so that they will be parallel with the sides of the glass article upon the chuck, for example, a tumbler T. The advantage of this adjustment is that the cutting edges of the wheels 40 engage the sides of the glass perpendicularly and therefore make cuts in the glass which are symmetrical on both sides of the cut, without the necessity of specially dressing the cutting wheels as is necessary if the cutting wheel shafts are parallel to each other.

In order to provide for this angular adjustment of the shafts 41, the front and rear standards 52 and 53 which support the cutter frames are mounted for angular adjustment upon the base 2. To this end the base is provided with curved slots 65 at the front of the machine, and with other and longer curved slots 66 at the rear of the machine as best shown in Fig. 5. The standards 52 and 53 are secured in place by means of bolts 67 which extend through the slots 65 and 66, and which, when tightened, hold the cutter frames rigidly in their adjusted position. Some or all of the slots may be provided with graduations, if desired, so as to facilitate the proper angular adjustment of the cutter frames in accordance with the angle of the sides of the glassware being cut. After this angular adjustment of the cutter frames has been made, a final adjustment of the angular positions of the cutter shafts may be produced by turning the eccentrics 50 on the shafts 51. In this manner the cutting wheels may be brought very accurately to the desired angle with relation to the articles to be cut. This angular adjustment of the cutting wheels is also useful in cutting designs upon articles having curved surfaces, the angular adjustment being such that the cutting wheels engage the glass in a direction perpendicular to the tangent to the surface of the glass at the point of engagement.

In commercial work it is necessary to adapt a single machine of this character to cut a considerable number of different designs which are given arbitrary numbers. Thus, a design designated as No. 1 may consist of a double wreath such as that shown on Fig. 12, and having 24 double cuts upon the circumference of the glass; a No. 2 design may have 48 cuts and may be adapted to a smaller tumbler requiring lateral or front and rear adjustment of the cutting wheel, and so on. There has heretofore been considerable delay in setting up a glass cutting machine for different designs, a skilled workman being required to make the approximate adjustments, and the machine then being started, a number of trial articles being cut, and further adjustments being made before the correct operating condition is reached. This wastes not only time but glassware, since the trial articles must usually be discarded.

In my present machine I provide means for indicating to the operator the adjustment of the cutter frames which is necessary for each commercial design. Such indicating means includes a plate 70 (Figs 2 and 6) secured to the base 2 beneath each of the shafts 51, and a pointer 71 carried loosely by each of the shafts 51. The plates 70 are graduated with markings 70ª, transversely and lengthwise, indicating the proper position of the pointer for each design to be cut. These markings are arrived at for each machine by a series of tests which fix once for all the necessary adjustment for each design. The position of the pointer for each adjustment is marked on the indicator plate, and when this has been done it is only necessary, in changing to a new design, for the operator to move the shafts 51 and bring the pointers 71 above the appropriate marks on the plates 70, thus producing the proper set-up for the design selected.

The horizontal members 46 of the swinging frames which carry the cutting wheels 40 are connected by means of a helical spring 75 (Fig. 5) which tends to pull the upper swinging parts of the cutter frames together, thereby drawing the cutting wheels toward the chuck. It will be noted that by reason of this spring connection each of the cutting wheels is free to stop at any point in its travel toward the chuck, independently of the other cutting wheel. It will also be noted that the movement of the cutting wheels toward and away from the chuck is accomplished without the use of slides, and that friction is thus avoided.

The frames carrying the cutting wheels are rocked to move the cutting wheels away from the chuck by means of a cam 76 (Figs. 2 and 3) which is secured to the horizontal shaft 32 adjacent to the front bearing 33 (Fig. 6). As best shown in Fig. 3, the cam 76 has three similar portions 77 which are spirally curved and which are separated by straight surfaces 78, so that three reciprocations of the cutter frames are produced by each rotation of the shaft 32.

The cam 76 engages two rollers 80 and 81 which are arranged side by side, as best shown in Fig. 2, and are carried respectively by levers 82 and 83 which are mounted pivotally near their outer ends upon a short standard 84. Springs 85 are secured between the base 2 and the outer ends of the levers 82 and 83, and hold the rollers 80 and 81 in engagement with the peripheral surface of the cam 76.

The two levers 82 and 83 are employed to actuate independently the frames which carry the cutting wheels. The lever 82 which is nearest the front of the machine, and is therefore seen on Fig. 1, actuates the swinging frame at the right of Fig. 1 while the other lever 83, which is seen on Fig. 3, actuates the swinging frame at the left of Fig. 1 and at the right of Fig. 3. The lever 82 is connected by means of a link 86 to the arm 87 of a bell crank lever which is mounted upon a stationary pivot pin 88 that is carried by the central standard 3. The lever arm 87 is carried by a collar 89 (Fig. 2) which loosely surrounds the pivot pin 88, and which also carries a downwardly projecting lever arm 90 forming the other arm of the bell crank lever which is actuated through the link 86. To the lower end of the lever arm 90 is secured one end of a turn-buckle link composed of screw threaded rods 91 and 92 which are connected by a turn buckle 93. The outer end of the screw-threaded rod 91 has an eye which fits over a pin 95 carried by a boss 96 which may be formed integral with the vertical arm 44 of the swinging frame, as shown in Fig. 6, and at the left of Fig. 3.

In a similar manner the lever 83 which operates the swinging frame at the left of Fig. 1, and at the right of Fig. 3, is connected by means of a link 97 to one arm 98 of a bell crank lever which is mounted on the stationary pivot pin 88 already referred to and which has an upwardly extending arm 99 to which is connected one end of a turn-buckle link composed of screw-threaded sections 100 and 101 connected by a turn buckle 102. The outer end of the threaded rod 101 is provided with an eye 103 which fits over a pin 104 carried by the front vertical member 44 of the cutter wheel frame at the left of Fig. 1, and at the right of Fig. 3.

The turn-buckles through which the rocking cutter wheel frames are connected to the operating cam provided for adjusting the space between the cutting wheels 40 to accommodate glass articles of different widths, and also provide for the use of cutting wheels of different diameters.

In order to prevent slight rotation of the chuck shaft by one of the cutting wheels which may engage the tumbler in advance of the other, or with greater frictional force, and thereby causing mismatching of the wreath leaves, I provide a brake which is automatically applied to the chuck shaft when the clutch lever 17 is thrown to start the cutting operation. For effecting this result, I secure an arm 215 (Figs. 1, 5, 6, 7) to the collar 16 that carries the lever 17. This arm extends under a brake lever 216 that is pivotally mounted at 217 (Fig. 5) and whose outer end is provided with a brake shoe 218 (Fig. 2) that is forced into breaking engagement with the inner chuck shaft sleeve 130, to hold the chuck against movement under the action of the cutting discs 40. Upon completion of the cutting operation and release of clutch lever 17, the arm 215 is lowered, thus permitting the braking lever 216 to be released from contact with shaft 130, by a spring 219 (Fig. 1). Release of the brake permits the chuck shaft to be more freely rotatable during the banding operation to be hereinafter described.

The compensating device.

Commercial tumblers and other circular hollow articles are not always perfectly round, and it is important that the cutting wheels for forming designs upon such hollowware be arranged to make cuts of uniform depth not only on ware that is exactly circular, but on ware that may be slightly flat at some points and unduly curved at others. If the cutting wheels are always stopped at the same point, the flatter portions of the article may be cut too little or not at all, while the protruding portions may be cut entirely through the wall of the article.

In order to cause the cutting wheels 40 of my present machine to produce cuts of uniform depth, I provide a pair of pivoted arms which are automatically separated to allow the tumbler, or other article, to be placed upon the chuck and which then close upon the surface of the article. These pivoted arms extend into the path of screws or other adjustable members carried by the pivoted cutter wheel frames. These adjustable members limit the movement of the cutting wheels toward the chuck by engaging the pivoted arms just referred to without actually coming in contact with the glass itself. When the design has been completed the compensator arms are moved away from the glass and therefore do not interfere with the removal of the completed article and the placing of a new article upon the chuck.

In the compensating mechanism shown in Figs. 3, 4 and 5 of the drawings, two arms 110 are pivoted at the points 111 to some convenient stationary part of the machine. As shown, these arms are supported by a trough 112 which extends beneath the cutting wheels 40 and which receives and drains away the lubricating water which is supplied to the cutting wheels through suitable piping, not shown. The pivoted arms 110 are connected by means of a spring 114 which tends to draw these arms toward the chuck. At their upper ends, the arms 110 may be provided with heads 115 for engaging the sides of the tumbler T which is shown in position on the chuck. The heads 115 are pivotally connected to the arms 110 and to adjustable eye-bolts 113, for a purpose to be hereinafter explained. The front upright members 44 of the swinging cutter wheel frames are provided with screw threaded transverse openings through which screws 116 extend toward the compensator arms 110. The screws 116 may be provided with knurled heads and with lock-nuts 117. The screws 116 are adjusted in accordance with the depth of cut that is desired, and when the frames are rocked toward the glass the ends of the screws 116 engage the members 110 and thereby limit the depth of the cut. This depth is regulated by the engagement of the heads 115 with the glass, so that uniform depth of cut is assured. It will be noted that the cutting wheels are free to stop independently and at different distances from the chuck if the walls of the glass article are irregular, this independent movement being secured by the use of the spring 75 which connects the cutter wheel frames and draws them yieldingly toward the chuck.

The feeler heads 115 are pivotally connected to both the arms 10 and the eye-bolts 113, the latter extending through perforations in brackets 118 that are secured to the upper ends of rocking members 44. By turning thumb nuts 113ª, the feeler members 115 are adjusted about their axes, so that the cutting wheels 40 can be made to properly engage tumblers of various sizes. This feature of adjustment is important, since tumblers of various sizes may be cut, as their axes are inclined when in cutting position, the feelers when set in proper diametral or radial alinement for a tumbler of given diameter will have a different alinement with respect to a tumbler of another diameter, and must therefore be then adjusted to their proper positions.

For the purpose of moving the compensator arms 110 away from the glass article after the design has been finished, a collar 120 is mounted upon the chuck shaft in such a way as to rotate with this shaft, while having a certain amount of sliding movement upon this shaft. The collar 120 carries two oppositely extending arms 121 which have beveled ends that are adapted to engage fingers 122 which extend inwardly and rearwardly from the compensator arms 110, as shown in Figs. 3 and 4. A spring 123, Fig. 2, surrounds the chuck shaft and tends to force the collar 120 and the arms 121 toward the fingers 122, thereby separating the fingers 122 and moving apart the compensator arms 110. A disc having a beveled edge may be carried by the collar 120 instead of the arms 121, and will operate in a similar way.

In order to control the movement of the collar 120, this collar is provided with a peripheral groove 124 in which is received a pin 125 carried by a shifting lever 126 which is pivoted at 127 to a stationary bracket 128. The lever 126 extends into the path of movement of the clutch lever 17 which controls the operation of the chuck and the cutting wheels. When the lever 17 moves to its forward position, shown in Fig. 5, it rocks the lever 126 upon its pivot 127 and withdraws the collar 120 against the compression of the spring 123 so as to release the fingers 122, thereby permitting the compensator heads 115 to be drawn into engagement with the surface of the glass article by means of the spring 114. As the cutting operation proceeds, the collar 120 rotates with the chuck shaft, carrying with it the fingers 121, and when the chuck shaft has made one complete revolution, the fingers 121 are again in the same position as when the operation was started. Thereupon the lever 17 is tripped by the withdrawal of the detent 122 in the manner described above, and the movement of the lever 17 to the rear releases the lever 126 and permits the spring 123 to force the fingers 121 upward and forward into engagement with the fingers 122. This separates the compensator arms so that they do not interfere with the removal of the tumbler or with placing a new tumbler upon the chuck.

Another form of compensator device is shown in Fig. 10. This device, like that which has just been described in connection with Figs. 3, 4 and 5, includes a pair of compensator arms 110$^a$ pivoted at 111$^a$ to a stationary part of the machine, such as the trough 112, and connected by a spring 114$^a$ which tends to draw these arms toward the chuck. The screws 116 co-operate with the arms 110$^a$ in the same manner as with the arms 110 described above.

The device of Fig. 13 differs from that of the preceding figures in the method of causing the compensator arms 110 to move into engagement with the glass at the beginning of the cutting operation, and moving away from the glass at the end of the operation. As shown in Fig. 13, a collar 120$^a$ is mounted upon the chuck shaft so as to rotate with this shaft and to have sliding movement thereon. The collar 120$^a$ has two oppositely extending arms 121$^a$ or an equivalent disc of similar diameter, the arm of the disc having beveled outer surfaces which engage fingers 122$^a$ extending inwardly and rearwardly from the compensator arms 110$^a$. A spring 123$^a$ surrounds the chuck shaft and tends to force the collar 120$^a$ toward the fingers 122$^a$. The arms 121$^a$ carry adjustable screws 125$^a$ which engage the edge of the tumbler T when the tumbler is placed upon the chuck.

When there is no glass upon the chuck, the compensator arms are in their open position because the spring 123$^a$ forces the arms 121$^a$ into engagement with the fingers 122$^a$, and thus holds the arms 110$^a$ in their outer position. When a glass is placed upon the chuck, its edge engages the screws 125$^a$ and moves the arms 121$^a$ away from the fingers 122$^a$, whereupon the spring 114$^a$ moves the compensator arms into engagement with the glass. When the glass is removed from the chuck, the spring 123$^a$ immediately returns the fingers 121$^a$ to the position where they separate the compensator arms so that they do not interfere with placing a new glass upon the chuck.

The chuck.

The chuck construction which I prefer to employ is shown in detail in Figs. 8 and 9. The hollow chuck shaft 7 which carries the intermittent gear wheel 36, surrounds a second hollow shaft 130 which in turn encloses an operating rod 131. In order to prevent the intermediate hollow shaft 130 from moving lengthwise, this shaft is provided with an annular groove just above the stationary bearing 5, and a flat ring 129, which is made in sections, fits into this groove and is screwed upon the upper surface of the bearing 5. The intermediate hollow shaft 130 has a reduced outer portion 132 to which a collar 133 is secured by means of a set screw 134. The collar 133 has an integral enlargement 135 which is provided with a series of radial slots through which extend flat jaws 136 which are capable of moving radially outward to grip an article, and inward to release the article. A rubber band 137 extends around the jaw members 136 as best shown in Fig. 9.

The chuck is also provided with an outer set of jaws which are carried by a collar 138, which, like the collar 133, is secured to the reduced portion 132 of the hollow shaft 130. The collar 138 is provided with three integral radial projections 139 which are provided with radial openings through which extend jaw members 140. The outer ends of the jaw members 140 are preferably widened, as shown at 141, suitably by securing short curved strips of thin metal to the ends of these jaw members, in order that the jaws may have suitable width of bearing surface upon the interior of the glass article. This is important in the case of optic ware having its inner surfaces composed of flat bands, for unless the outer jaws have sufficient effective width to engage more than one of these flat bands, the article will be tilted upon the chuck and will therefore be cut improperly. A rubber band 142 extends around the outer ends of the jaws.

The sliding central rod 131 which extends through the shaft 130 is employed for the purpose of expanding the chuck jaws 136 and 140. Near its outer end the rod 131 is pierced transversely to receive a screw 145 which extends through slots 146 formed in the hollow shaft 130 and serves to secure to the rod 131 a cone shaped collar or spreader 147, the outer surfaces of which engage the tapering inner ends of the lower chuck jaws 136. The rod 131 is normally retracted by means of a spring 148, Fig. 2, which is compressed between the lower end of the intermediate chuck shaft 130 and a head 149 which is secured to the lower end of the rod 131. The spring 148 is made strong enough to expand the jaws 136 and to cause these jaws, acting through the rubber band 137, to tightly grip the interior of the glass article.

Three small distance rods 150, one of which is shown in Fig. 8, extend through openings in the upper collar 138. The lower ends of the rods 150 are secured to the upper surface of the expanding cone 147, and the upper ends of these distance rods rest against the lower surface of another expanding cone member 151, the sides of which engage the tapering inner ends of the upper clutch jaws 140. The upper expanding cone member 151 carries three laterally extending hooks 152, and three springs 153 are connected between the hooks 152 and a plate 154 which is secured to the upper surface of the lower chuck collar 138.

When the chuck is to be contracted so as to release the tumbler T, the rod 131 is moved upwardly, as will be hereinafter explained, and carries with it the lower expanding cone 147 which, acting through the distance rods 150, pushes up the expanding cone 151. The chuck jaws 136 and 140 are thus permitted to move inwardly under the influence of the stretched rubber bands 137 and 142. The tumbler T may then be removed and replaced by another tumbler. When the rod 131 is released, the spring 148 returns this rod to its lower position, causing the lower expanding cone 147 to force the clutch jaws 136 outwardly. At the same time, the springs 153 draw down the upper expanding cone member 151, thereby expanding the upper clutch jaws 140. This arrangement provides for simultaneous but independent operation of the upper and lower chuck jaws so as to enable these jaws to properly grip hollow glass articles of different shapes.

Movement of the chuck rod 131 against the compression of spring 148 is effected by a hand lever 230 (Figs. 2 and 5) that is secured to a rock shaft 231 to which is also secured an arm 232, so that as the lever 230 is rocked against the tension of its retracting spring 230ᵃ the arm 232 is brought into engagement with the lower end 149 of rod 131 to move it upwardly to release the tumbler from the chuck.

To the shaft 231 is also secured a crank arm 233 that is connected by a link 234 to an arm 235 of a crank shaft 236 which is pivotally supported on a fixed bracket 237. The shaft 236 has another arm, 238, that supports, at its outer end, an adjusting screw 239 which has ball and socket connection to a stop or holding member 240 that, in one position of the arm 238, abuts against the bottom of the tumbler T and holds it against retractive movement in a direction axially of the chuck. When the lever 230 is rocked to move rod 131 to release position, motion is transmitted through link 234 to rock shaft 236 in a counter clockwise direction, thus swinging the stop 240 away from the tumbler to permit removal from the chuck. Movement of the lever 230 to permit the chuck rod 131 to cause the chuck to engage a tumbler brings the stop 240 to the operative position shown in Figs. 2 and 3.

As an additional guide for positioning the glass articles upon the chuck, I provide a stop screw 155, Figs. 8 and 9, which screws into a plug 157 that is screwed into the outer end of the intermediate hollow clutch shaft 130. The screw 155 determines the extent to which the tumbler T can be forced down upon the chuck, and by suitably adjusting this screw I provide for positioning articles of different depth in proper relation to the cutting wheels.

*The bander.*

Mounted above the cutting wheels and their attachments is a banding device which preferably operates after the cutting wheels have finished their work upon the tumbler or other article. This bander is illustrated in the form used for making the design shown in Fig. 12 where the tumbler T is provided with a wreath consisting of cuts A together with the bands B above and below the wreath, and a narrower band C in the center of the wreath. It has heretofore been a matter of difficulty to produce a design of this character in which the bands are in exactly the proper relation to the cuts composing the wreath. This difficulty has been due largely to the fact that it has been necessary to perform the cutting and banding operations on separate chucks, the usual procedure being to cut the wreath on one machine and then transfer the tumbler to the chuck of another machine, which applies the bands. It is difficult if not impossible, to place the tumbler upon the second chuck in exactly the right position to bring the bands in correct relation to the cuts composing the wreath, particularly when the ware is slightly irregular in shape as in some grades of commercial tumblers.

The bander with which my present machine is provided avoids this difficulty by operating upon the tumbler while it is still in its original position upon the chuck which holds it while the cutting wheels are producing the wreath. Therefore, the wreath and the bands are always in their correct relative position, which is determined by the adjustment of the banding wheels with respect to the cutting wheels.

As shown in Fig. 2 of the drawing, the banding mechanism is mounted upon two inclined standards 160 and 161 which rise respectively from the front and rear central standards 3 and 4 of the machine immediately above the bearings 5 and 6 of the chuck shaft. The rear standard 161 carries a small electric motor 162, to the armature shaft 163 of which is secured a bevel pinion 164 meshing with a bevel gear 165 on an inclined shaft 166 which also carries a spur gear wheel 167 meshing with a spur gear wheel 168 that is journaled in the standard 160 and has a toothed hub portion 169 that serves as a pinion to transmit power to a gear wheel 17ª.

The gear wheel 170 is secured to a cam shaft 171 that is journaled in bracket members 172 and 173. The cam shaft 171 is provided with three cams 174, that engage cam rollers 175 (Fig. 12) which are journaled in cages 176, said cages being slotted at 177 to permit them to have vertical reciprocation as the cams 171 are rotated against rollers 175.

Cages 176 are connected to adjusting screws 178 that are in turn supported from brackets 179 which are supported from a bar 180 whose ends are connected to the brackets 172 and 173. The brackets 179 are positioned longitudinally of bar 180 by means of set screws 179ª. Springs 181 serve to exert tension in a downward direction upon the cages 176. The cages are connected at their lower ends to eye bolts 182, that have adjustment longitudinally of the cages and are pivotally connected to disc-supporting arms 183. These arms, at their inner ends, are pivotally connected to a shaft 184 and at their outer ends are bifurcated to receive banding discs 185 of abrasive material. These discs are secured rigidly to the arms 183, by means of washers 186 that lie within central perforations in the discs and are held in place by screws 187 which serve also to clamp the discs in any desired position of circular adjustment. The discs 185 are normally fixed on their axes, so that when a tumbler is being banded there is less chattering and bumping of the discs on the tumbler than if the discs were rotating. The rotative adjustment permits the discs to be turned from time to time, as their peripheries are worn away.

It will thus be seen that upon energization of the motor 162 the cam shaft 171 will be rotated from the position shown in Fig. 12 to permit the cam rollers 175 and their connected parts to descend, thus bringing the banding discs 185 into contact with the tumbler T as indicated by dotted line 185ª (Fig. 12). When the shaft 171 has turned through 180 degrees, the discs or banding wheels 185 will begin to travel upwardly, out of contact with the tumbler. Upon completion of the upward movement the circuit of the motor will be broken by the rotary switch 188, which meantime has been turned 180°, by a pinion 189, which is secured to shaft 171, and gear wheel 190.

The motor 162 operates to rotate the chuck continuously while the banding wheels are in contact with the tumbler. For this purpose the inclined shaft 166 which, as stated above, is driven by the motor 162 through the bevel gears 164 and 165, is provided near its lower end with a toothed clutch member 200 which is slidably secured to the shaft 166 by means of pins 201 extending through slots 202 in the clutch member 200. The clutch member 200 is backed by a spring 203 and is provided with clutch teeth meshing with similar clutch teeth on the hub 204 of a spur pinion 205 which is loosely mounted on the lower end of the shaft 166. The pinion 205 meshes with a large spur gear 206 that is keyed to the intermediate hollow chuck shaft 130. A toothed clutch member 207 is slidably secured to the intermediate clutch shaft 130 above the gear wheel 206 by means of pins 208 extending through slots 209 in the clutch member 207. The teeth of the clutch member 207 mesh with similar clutch teeth formed on the lower end of the outer hollow chuck shaft 7. A spring 210 surrounds the intermediate chuck shaft 130 between the clutch member 207 and the hub of the gear 206 and keeps the teeth af the clutch member 207 in engagement with the teeth on the end of the chuck shaft 130.

By the arrangement just described, the chuck carrying the tumbler is rotated in a step-by-step manner by the main shaft 8 while the cutting wheels are in operation and is thereafter rotated continuously by the motor 162 while the banding wheels are in operation. The intermittent rotation is produced, as in the manner already described, through the large intermittent bevel gear 36 that is carried by the outer hollow chuck shaft 7. This motion is communicated through the clutch member 207 to the hollow intermediate clutch shaft 130 which carries the clutch head. During this operation the large gear 206 turns idly and also turns the pinion 205 on the shaft 166, but this shaft is not rotated because the teeth of the clutch members 200 and 204 are so shaped that they move idly past each other at this time. When, however, the intermittent rotation of the chuck is stopped by means of the throw-out device described above and the electric motor 162 is energized to drive the shaft 166, this motion is communicated through the clutch member 200 to the pinion 205 which drives the gear 206, and thereby rotates the intermediate clutch shaft 120 continuously. During this continuous rotation of the chuck 130 the teeth of the clutch member 107 pass idly over the teeth in the lower end of the outer clutch shaft 7, and therefore the train of gearing associated with the main shaft is not affected during the banding operation.

The circuit of the motor 162 is controlled by a manually operable switch 245 (Fig. 6), that is normally closed, and by two automatically operable three-pole switches 188 and 246 (Figs. 2, 6, and 8). The rotary switch 188 is operated by the cam shaft 171 as above explained. Switch 246 is also of the rotary type and is provided with a ratchet 247 (Fig. 6) with which engages a pawl 248 that is carried by a horizontally reciprocable slide 249 which is normally held in expanded position by a spring 250. The left hand end of the slide 249 is provided with an adjustable stop 251 that lies in the path of movement of the clutch lever 17, so that when such lever is released and retracted by its spring 18, the slide will be moved to the right, carrying with it the pawl 248, thus operating the switch to close the motor circuit and start the rotation of the chuck shaft, through gears 165, 206, etc. At the same time the banding discs will be lowered by the cam shaft 171. It will be remembered that the lever 17 is released upon completion of the wreath that is cut by the grinding wheels 40, to stop the rotation of the chuck by the shaft 8. Thus the banding operation is automatically started upon completion of the wreath.

Fig. 14 shows, diagrammatically, the relation of the switches 246 and 188 to the motor 162. In the position shown, the motor circuit is completed. Assuming that a cutting operation has been completed and the switch 246 moved to the position shown, by the lever 17, the motor 162 operates the chuck shaft and the banding discs as explained above. Upon movement of the switch 188 through 180° the banding will be completed, and the circuit will be broken, since contact 188$^a$ will then be in engagement with an insulated portion of the switch 188. Contacts 188$^b$ and 188$^c$ will then be bridged. Upon completion of the next cutting operation, the position of the switch 246 will be reversed, through step movement thereof by the pawl 248, thus again completing the circuit of the motor and starting another banding operation. It will be understood that since the switch 246 cannot be conveniently moved through 180° at each actuation thereof, I provide a plurality of contacts and conductors as indicated in Fig. 6, so that its line connections are reversed at each actuation thereof, the additional wiring being omitted from Fig. 14, for the sake of simplicity of description.

*Operation.*

When the operation of the machine begins, the banding wheels are raised from the chuck, the compensator arms 110 are separated by means of the fingers 121, the sprocket wheel 14 is rotating idly, and the grinding wheels 40 are rotating but not reciprocating. By pressure applied manually or automatically to the head 149 on the lower end of the chuck rod 131, the clutch jaws are contracted and a tumbler T, or other glass article to be decorated, is placed upon the chuck and the head 149 is released, thereby causing the chuck jaws to expand and grip the tumbler firmly. The clutch lever 17 is then moved forward either manually or automatically. This engages the clutch on the main drive shaft 8, at the same time presses forward the shifting lever 126 which withdraws the fingers 121 to the rear and permits the spring 114 to bring the compensator heads 115 into engagement with the glass, and applies the brake shoe 218 to the chuck shaft. The cam 76, acting through the levers 82 and 83 and the other connections described above, permits the spring 75 to rock the cutting wheels into engagement with the glass, where they produce cuts of the depth determined by engagement of the screws 114 with the compensator arms 110. Thereupon the cam 76 causes the cutting wheel frames to rock in the reverse direction thereby removing the cutting wheels from the glass. While the cutting wheels are thus separated from the glass, the intermittent pinion 35 acts through the large intermittent gear wheel 36, the hollow chuck shaft 7 and the clutch member 207, to give the chuck a partial rotation which presents a new surface for the action of the cutting wheels 40. This operation continues until the chuck has made one complete revolution, whereupon the throwout member 26, which is carried by the chuck shaft 7 causes the detent 22 to withdraw from the clutch lever 17 and permits the spring 18 to disengage the clutch on the main drive shaft 8. The release of the clutch member 17 also releases the brake shoe 218, and also the shaft lever 126, to permit the fingers 121 to be pushed forward by the spring 123 thereby separating the compensator heads 115 from the surface of the glass. At this time the switch 246 is actuated by the lever 17, thereby energizing the motor 162 and lowering the banding discs upon the tumbler, through the connections described above. At the same time the intermediate hollow chuck shaft 130 is set in continuous rotation through the clutch member 200, the pinions 205 and the gear 206, the result being that the chuck is given one or more complete revolutions while the banding wheels are in contact with the glass. Thereafter the banding discs are raised from the glass by the cams 174, the motor 162 is stopped, and the chuck jaws are again released by pressure applied to the head 149. The finished tumbler may then be removed and replaced by a new tumbler before the next cycle of operations begins.

The operation may be varied, if desired, by first causing the banding wheels to put the bands upon the tumbler and then applying the wreath by means of the cutting wheels 40. It is generally more convenient, however, to apply the wreath first and to finish the tumbler by applying the bands.

Numerous other variations may be resorted to without departing from my invention. Thus the number of banding wheels may be greater or less than three. They may be spaced apart to any extent desired, or may be entirely omitted if the ware is not to be banded. Likewise, the machine may be used as a simple bander, if desired, by merely removing the cutting wheels 40, and the chuck shaft may be given a lengthwise movement while the cutting wheels are in action so as to produce a spiral cut or a spiral series of cuts upon the glass. The designs which may be applied to the glassware by this machine are very numerous and the machine may be quickly changed to produce the various designs by the simple adjustments described above.

It is important that adjustment of the cutting wheels must be made when designs are to be made circumferentially of the tumblers at various points intermediate the ends thereof. The condition of ideal cutting necessitates that the plane of the cutting wheels 40 shall intersect the inclined axial plane of the chuck and the transverse plane thereof at the point of intersection of said inclined and transverse planes. This mode of positioning may be diagrammatically shown by drawing a line parallel to the axis of the chuck, a diametral line substantially at right angles to said axis, and a line paralleling the vertical diametral line of one of the cutting wheels.

I claim as my invention:

1. Glass cutting apparatus comprising a rotatable shaft, a chuck carried thereby for supporting an article to be operated upon, driving mechanism for said shaft, a clutch operable to connect and disconnect the shaft and said mechanism, a brake shoe for said shaft, and means for causing said shoe to engage the shaft when the clutch is operated to cause rotation of said shaft by said driving mechanism.

2. Glass cutting mechanism comprising a shaft, a chuck carried thereby for supporting an article to be operated upon, driving mechanism for said shaft, a clutch for effecting driving connection between said shaft and said mechanism, a clutch lever for operating the clutch, a brake shoe for the shaft, and a connection between said lever and said shoe for moving said shoe relatively to the shaft upon operation of the clutch lever.

3. Glass cutting mechanism comprising a cutter, a chuck shaft, a chuck carried by said shaft for supporting an article to be operated upon, driving mechanism, a clutch for connecting said mechanism to said shaft, a clutch lever for operating said clutch, a banding device, and means operable upon movement of said lever to disengage the clutch, for moving said banding device into engagement with the article carried by said chuck.

4. Glass cutting mechanism comprising a cutter, a chuck shaft, a chuck carried by said shaft for supporting an article to be operated upon, driving mechanism, a clutch for connecting said mechanism to said shaft, a clutch lever for operating said clutch, a banding device, means operable upon movement of said lever to disengage the clutch, for moving said banding device into engagement with the article carried by said chuck, and means for moving said banding device to inoperative position upon completion of the banding operation.

5. Glass cutting mechanism comprising a cutter, a chuck shaft, a chuck carried by said shaft for supporting an article to be operated upon, driving mechanism, a clutch for connecting said mechanism to said shaft, a clutch lever for operating said clutch, a banding device, means operable upon movement of said lever to disengage the clutch, for moving said banding device into engagement with the article carried by said chuck, and means for effecting rotative movement of the chuck shaft upon disengagement of said clutch and for bringing said shaft to rest upon completion of a banding operation.

6. Glass cutting apparatus comprising a cutting device, a chuck for supporting an article to be cut, means for rotating said chuck, means for bringing said chuck to rest upon completion of a cutting operation, a banding device, and means operated by said last-named means for moving said banding device into engagement with an article carried by the chuck and for imparting rotative movement to the chuck.

7. Glass cutting apparatus comprising a cutting device, a chuck for supporting an article to be cut, means for rotating said chuck, means for bringing said chuck to rest upon completion of a cutting operation, a banding device, means operated by said last-named means for moving said banding device into engagement with an article carried by the chuck and for imparting rotative movement to the chuck, and means for moving said banding device to inoperative position when said chuck has been rotated a given number of revolutions.

8. Glass cutting apparatus comprising a chuck shaft, a chuck carried by said shaft for supporting an article to be cut, a cutting wheel, driving mechanism for said shaft, a clutch and clutch lever for effecting engagement between said driving mechanism and said shaft, a banding device, an electric motor for driving said device, a switch controlling the circuit to said motor, and means associated with the chuck-moving mechanism, for operating said switch to close the circuit of the motor upon completion of the cutting operation.

9. Glass cutting apparatus comprising a chuck shaft, a chuck carried by said shaft for supporting an article to be cut, a cutting wheel, driving mechanism for said shaft, a clutch and clutch lever for effecting engagement between said driving mechanism and said shaft, a banding device, an electric motor for driving said device, a switch for controlling the circuit to said motor, and means actuated by said clutch lever upon disengagement of the clutch at the completion of the cutting operation, for operating said switch to close the circuit of the motor.

10. Glass cutting apparatus comprising a chuck shaft, a chuck carried by said shaft for supporting an article to be cut, a cutting wheel, driving mechanism for said shaft, a clutch and clutch lever for effecting engagement between said driving mechanism and said shaft, a banding device, an electric motor for driving said device, a switch controlling the circuit to said motor, means controlled by said clutch lever, for operating said switch to close the circuit of the motor upon completion of the cutting operation, and a switch actuated by the banding operation, for interrupting the motor circuit.

11. Glass cutting apparatus comprising a chuck shaft, a chuck mounted thereon for carrying an article to be cut, a cutting wheel, a banding disc, and means automatically operable upon completion of a cutting operation to move said banding disc against an article carried by said chuck.

12. Glass cutting apparatus comprising a chuck shaft, a chuck mounted thereon for carrying an article to be cut, a cutting wheel, a banding disc, and means automatically operable upon completion of a cutting operation to move said banding disc against an article carried by said chuck and for moving said banding disc to inoperative position upon completion of the banding operation.

13. In glass cutting mechanism, the combination with a chuck for holding an article to be cut, a cutter and a cutter support movable into engagement with said article, of means for regulating the depth of cut, comprising a stop member having a laterally extending nose portion adapted to engage the article, a pivotal support for said stop, means for adjusting said stop about its pivot, and a member carried by the cutter support for engaging said stop when the cutter moves toward the chuck.

14. In glass cutting mechanism, the combination with a chuck for holding an article to be cut and a cutter movable into engagement with said article, of means for regulating the depth of cut, comprising a stop member having a laterally extending nose portion adapted to engage the article, a pivotal support for said stop, means for adjusting said stop about its pivot, and a member carried by the cutter for engaging said stop when the cutter moves toward the chuck, the axis of said pivot extending in the same general direction as the axis of the chuck.

15. In glass cutting mechanism, the combination with a chuck for holding an article to be cut and a cutter movable into engagement with said article, of means for regulating the depth of cut, comprising a stop, a lever pivotally connected at one end to said stop and at its other end connected to a fixed point, an adjusting screw pivotally connected to said stop at a point removed from its pivotal connection to said lever, a laterally extending nose portion carried by said stop for engaging an article to be cut, and a member carried by said cutter for engaging said stop.

16. In glass cutting mechanism, the combination with a chuck for holding an article to be cut and a cutting wheel disposed at each side of said chuck, of means for regulating the depth of cuts, comprising a stop member disposed at each side of said chuck, and having a nose portion adapted to engage one side of said article, a pivotal support for each of said stops, means for adjusting said stops about their pivots to vary the positions of said nose portions with respect to the axis of the chuck, and a member carried by each of said cutting devices for engaging said stops when said devices are moved toward the chuck.

17. In glass cutting mechanism, the combination with a chuck for holding an article to be cut and a cutting wheel disposed at each side of said chuck, of means for regulating the depth of cuts, comprising a stop member disposed at each side of said chuck and having a nose portion adapted to engage one side of said article, a pivotal support for each of said stops, means for adjusting said stops about their pivots to vary the positions of said nose portions with respect to the axis of the chuck, a member carried by each of said cutting devices for engaging said stops when said devices are moved toward the chuck, a spring whose opposite ends are connected to said stops for yieldably holding them in engagement with the opposite sides of said article, and means for moving said stops to inoperative position against the tension of said spring.

18. Glass cutting apparatus comprising an expansible chuck for engaging an article to be cut, a cutting wheel for operating on the article, means for expanding and contracting the chuck to engage and disengage an article, a holding member for preventing movement of an article from the chuck by engagement with an exterior portion of the article, and a connection between said means and said holding member whereby said holding member is moved to inoperative position upon contraction of the chuck.

19. Glass cutting apparatus comprising an expansible chuck for engaging an article to be cut, a cutting wheel for operating on the article, means for expanding and contracting the chuck to engage and disengage an article, a holding member for preventing movement of an article from the chuck by engagement with an exterior portion of the article, and a connection between said means and said holding member whereby said holding member is moved to operative position upon expansion of the chuck.

20. Glass cutting apparatus comprising an expansible chuck for engaging an article to be cut, a cutting wheel for operating on the article, and means for expanding and contracting the chuck to engage and disengage an article, said means including a rod, a stop member for engaging the bottom of an article to hold it on the chuck, and a connection between said stop member and said rod for moving said stop member to inoperative position upon contraction of the chuck, and into operative position upon expansion of the chuck.

21. Glass cutting apparatus comprising a cutting device, a chuck for supporting an article to be cut, means for rotating said chuck, means for moving the cutting device into engagement with said chuck, and means for adjusting the cutting device so that it will engage an article carried by said chuck at the point of intersection of the axial plane of the chuck and any one of a plurality of its transverse planes.

22. Glass cutting apparatus comprising a cutting device, an inclined chuck for supporting an article to be cut, means for rotating said chuck about its inclined axis, means for moving said cutting device into engagement with an article carried by the chuck, and means for varying the path of movement of said cutting device to cause it to engage the article at the point of intersection of the inclined plane of the chuck and a predetermined diametral plane thereof.

In testimony whereof I, the said JAMES BOYD GREER, have hereunto set my hand.

JAMES BOYD GREER.